US012183352B2

(12) United States Patent
Sangston

(10) Patent No.: US 12,183,352 B2
(45) Date of Patent: Dec. 31, 2024

(54) MULTI-ORDER OPTIMIZED AMBISONICS DECODING

(71) Applicant: Sony Interactive Entertainment Inc., Tokyo (JP)

(72) Inventor: Brandon Sangston, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 286 days.

(21) Appl. No.: 17/932,650

(22) Filed: Sep. 15, 2022

(65) Prior Publication Data

US 2024/0096334 A1 Mar. 21, 2024

(51) Int. Cl.
*G10L 21/02* (2013.01)
*G10L 19/005* (2013.01)
*G10L 19/008* (2013.01)

(52) U.S. Cl.
CPC .......... *G10L 19/008* (2013.01); *G10L 19/005* (2013.01)

(58) Field of Classification Search
CPC .. H04S 3/008; H04S 2420/01; H04S 2420/11; H04S 2400/11; G10L 19/008; G10L 19/005; G10L 21/02
USPC .......................................................... 704/200
See application file for complete search history.

(56) References Cited

U.S. PATENT DOCUMENTS 8,379,868 B2 * 2/2013 Goodwin .............. G10L 19/008 381/23
2009/0252356 A1 10/2009 Goodwin et al.
2016/0057556 A1 2/2016 Boehm et al.
2018/0027123 A1 1/2018 Cartwright et al.
2019/0297446 A1 9/2019 Jax et al.
2019/0392846 A1 12/2019 Kim et al.
2020/0092422 A1 3/2020 Dickins et al.
2021/0049737 A1 2/2021 Brandt et al.
2021/0098004 A1 4/2021 Sen et al.
2021/0204085 A1 7/2021 Claar
2021/0343300 A1 11/2021 Küch et al.
2022/0014868 A1 1/2022 Binn et al.
2022/0132262 A1 4/2022 Guérin
2022/0159404 A1 5/2022 Stringer et al.
2022/0225045 A1 * 7/2022 Kordon ................... H04S 3/008
2023/0230607 A1 * 7/2023 Van Veen ................ G10L 21/02 704/200

OTHER PUBLICATIONS

Heller et al., Optimized Decoders for Mixed-Order Ambisonics*, 1Artificial Intelligence Center, SRI International, Menlo Park, CA, May 23, 2021.

(Continued)

*Primary Examiner* — Md S Elahee

(74) *Attorney, Agent, or Firm* — John L. Rogitz; John M. Rogitz

(57) ABSTRACT

Ambisonics audio such as may be used for computer simulations such as computer games is improved by using multi-order optimizations that frame an optimization problem that minimizes a cost function across a subset of Ambisonics orders for a chosen Ambisonics order "N". In a simple form, this cost function minimizes error across all orders (0<=n<=N), and additional weighting is applied to emphasize or de-emphasize particular orders. The cost functions and optimization criteria may be different for binaural and speaker outputs.

20 Claims, 6 Drawing Sheets

(56) References Cited

OTHER PUBLICATIONS

F. Zotter, M. Frank, Ambisonic decoding with panning-invariant loudness on small layouts (AllRAD2), in 144th AES Convention, prepr. 9943 (Milano, 2018).
Gorzel, M, Allen, A, et. al. Efficient Encoding and Decoding of Binaural Sound with Resonance Audio. AES Conference on Immersive and Interactive Audio, York, UK, Mar. 27-29, 2019.
Hold et al., "Improving Binaural Ambisonics Decoding By Spherical Harmonics Domain Tapering and Coloration Compensation", Proc. ICASSP 2019, Brighton, United Kingdom.
Lipshitz et al., "In-Phase Crossover Network Design", Audio Research Group, University of Waterloo, Audio Eng Soc, vol. 34, No. 11, Nov. 1986.
Zotter, Franz & Frank, Matthias. (2012). All-Round Ambisonic Panning and Decoding—Abstract. Journal of the Audio Engineering Society. 60. https://www.semanticscholar.org/paper/All-Round-Ambisonic-Panning-and-Decoding-Zotter-Frank/33659c7767b9a44fe392ddb91dab8ec429b81b02.
"International Search Report and Written Opinion", dated Mar. 19, 2024, from the counterpart PCT application PCT/US23/073252.

* cited by examiner

MULTI-ORDER OPTIMIZED AMBISONICS DECODING

FIELD

The present application relates generally to Multi-order Ambisonics decoding.

BACKGROUND

Ambisonics is a method for recording, mixing, and playing back three-dimensional 360-degree audio. It is particularly advantageous in virtual reality (VR) applications, which require 360° audio solutions. The basic approach of Ambisonics is to treat an audio scene as a full 360-degree sphere of sound coming from different directions around a center point. The spatial sound field is projected into spherical harmonics, essentially overlapping spheres or "sound fields" the number and resultant shapes of which depend on the order of the Ambisonics being used. The center point of the spatial sound field is where the microphone is placed while recording, or where the listener's 'sweet spot' is located while playing back. Note that Ambisonics works not just with microphone recording but also as a synthesized technique for existing audio files such as may be generated for a computer simulation such as a computer game.

Incidentally, Ambisonics is not to be confused with conventional surround sound technologies, which create an audio image by sending audio to a specific, pre-determined array of speakers, such as stereo (two speakers), 5.1 surround (six speakers). 7.1 surround (eight speakers). In contrast, Ambisonics does not send audio signal to any particular number of speakers, but instead can be decoded to any speaker array because Ambisonics audio represents a full, uninterrupted sphere of sound, without being restricted by the limitations of any specific playback system.

SUMMARY

As recognized herein, Ambisonics decoders are typically optimized for a single Ambisonics order to maximize quality of soundfield reproduction. As further understood herein, however, it is common practice (especially in games) for Ambisonics sub-mixes of multiple orders to be combined into a single high-order Ambisonics mix. Thus, there is a need for a solution that produces high quality Ambisonics reproduction for this multi-order use case.

Accordingly, present principles use multi-order optimizations in a decoder by framing an optimization problem that minimizes a cost function across a subset of Ambisonics orders for a chosen order "N". In its simplest form, this cost function minimizes error across all orders (0<=n<=N), but additional weighting may be applied to emphasize or de-emphasize particular orders. The cost functions and optimization criteria may be different for binaural and speaker outputs.

In one aspect, an apparatus includes at least one processor configured with instructions which are executable to receive Ambisonics audio having at least two soundfields of different orders. The instructions are executable to identify at least one optimization function, and to apply at least one cost function to the optimization function to optimize at least one error over the at least two soundfields in a single spatial window of the Ambisonics audio. The cost function includes at least one weighting vector to emphasize or de-emphasize at least one of the orders. Based at least in part on at least one output of the cost function, the instructions are executable to generate audio signals for play on at least one speaker.

In some examples the error includes at least one error vector.

Without limitation, the optimization function can include a Broyden-Fletcher-Goldfarb-Shanno (BFGS) function, a Sequential Least Squares Programming (SLSQP) function, a trust-region function, a quasi-newton function, and a neural-network.

The cost function may be agnostic of (independent of the characteristics of) a decoder configured to decode the audio signals. In this case, the cost function can include metrics derived from an Ambisonics encoding function, such maximizing an energy vector across the at least two orders, minimizing apparent-source width, and minimizing frequency-dependent error.

Or, the cost function may be dependent on a decoder configured to decode the audio signals. In such as case, the cost function can include minimizing error from the decoder by comparing output of the decoder against a reference.

The cost function may calculate frequency space error metrics.

In some examples the instructions can be executable to configure the audio signals for play on a Binaural system at least in part by minimizing an error metric against at least one Head-Related Transfer Function (HRTF). In other examples the instructions can be executable to configure the audio signals for play on a speaker system having more than two speakers at least in part by minimizing an error metric against a direct speaker signal or point-source amplitude panning algorithm. The panning algorithm can include a vector-based amplitude panning algorithm.

In another aspect, a method is disclosed for computing an Ambisonics spatial window that is optimized for a head-related transfer function (HRTF). The method includes optimizing the Ambisonics spatial window across at least two orders. The method also includes using an optimization function for minimizing a magnitude of an error vector created by at least one cost function against the reference HRTF across the at least two orders to return the Ambisonics spatial window. The method includes using the Ambisonics spatial window to play audio on at least one speaker.

In another aspect, a decoder assembly includes circuitry configured to receive Ambisonics audio having at least two soundfields of different orders. The circuitry is configured to apply at least one cost function to an optimization function to optimize at least one error over the at least two soundfields in a single spatial window of the Ambisonics audio. The cost function includes at least one weighting vector. Based at least in part on at least one output of the cost function, the circuitry outputs audio signals for play on at least one speaker.

The details of the present application, both as to its structure and operation, can be best understood in reference to the accompanying drawings, in which like reference numerals refer to like parts, and in which:

DETAILED DESCRIPTION

Figure 1:
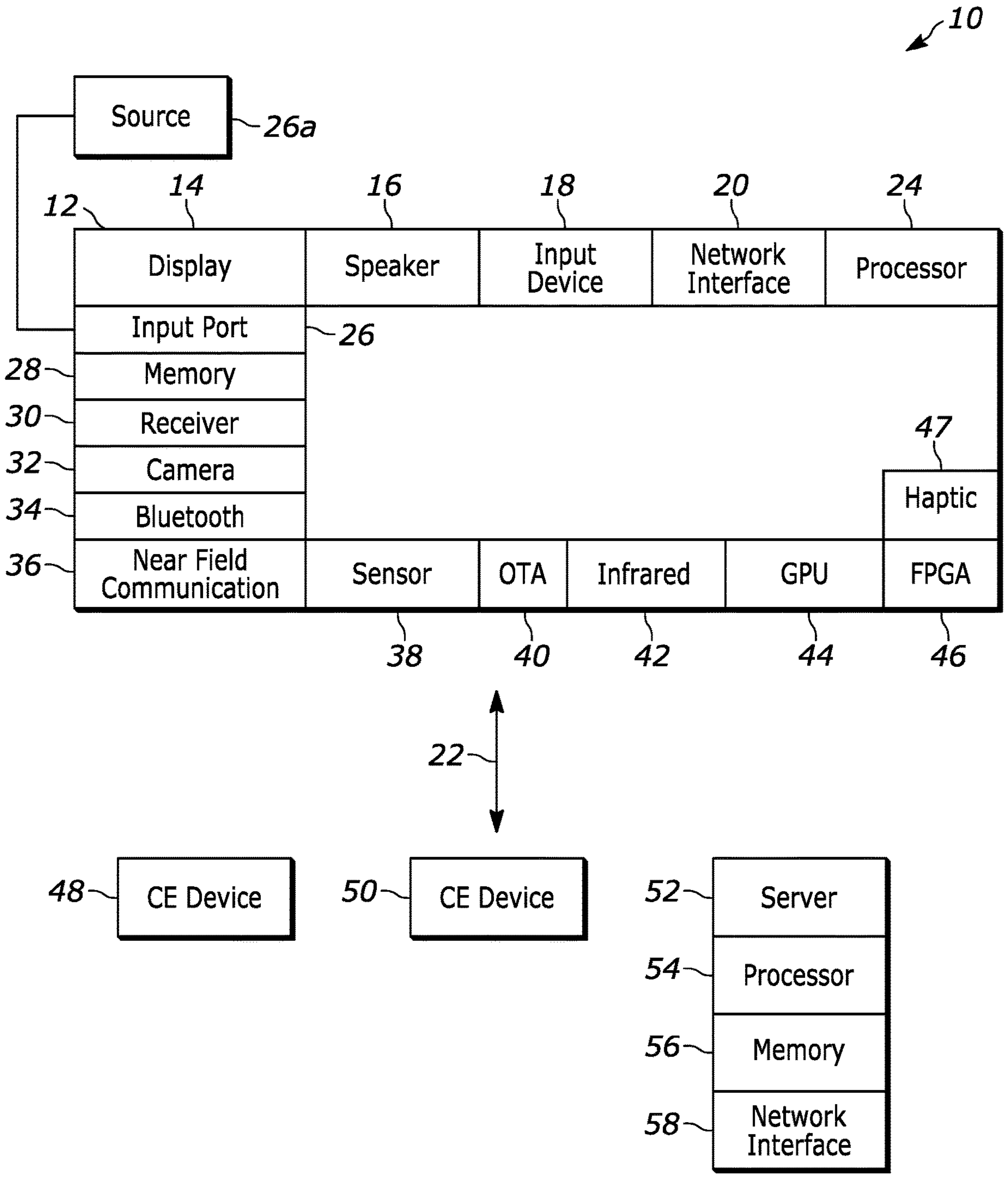
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Prior to turning to the remaining figures, in Ambisonics, an infinite series of polynomials defining a sound field is truncated to a highest polynomial order, such as five for example, with less truncation resulting in higher fidelity. Typically, a decoder receives a mix of Ambisonics orders. As an example, a game developer might be targeting a maximum of fifth order Ambisonics, which is 36 channels of audio data. Within the fifth order Ambisonics mix might also be contained first order Ambisonics content (first four channels), or third order Ambisonics content (first 16 channels). There will still be 36 channels of content total (fifth order Ambisonics), but the audio signals from each subset order (first, third, etc.) will be mixed/summed together. Figures below illustrate example shapes of the patterns of these orders, which may be thought of as patterns of virtual microphones including omnidirectional, cardioid, hypercardioid, figure-of-eight or anything in between pointing in any direction.

As recognized herein, absent present principles, once the Ambisonics orders are mixed, standard single-order techniques can no longer be correctly applied to improve the decode. Thus, there is a use for optimizing decoding in such a way that the quality is improved across some selection of multiple orders. To do this, a set of weights is generated that is optimal across the selected orders for a standalone speaker system or binaural speaker system such as headphones, in some cases using a partially offline process.

The components and techniques below may be implemented by any one or more of the devices and components described herein.

Figure 2:
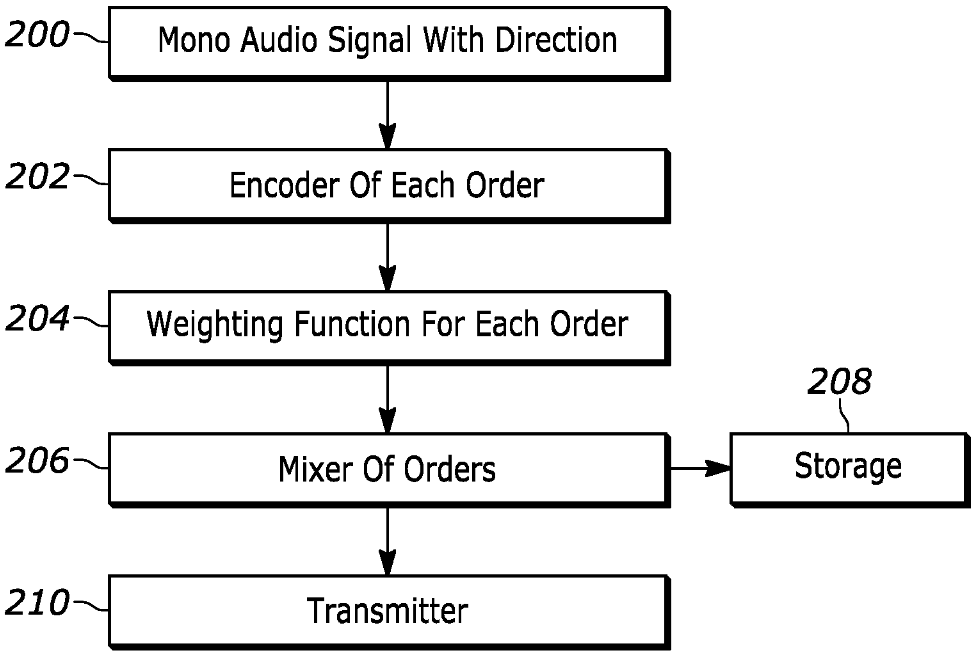
FIG. 2 illustrates an example encoder for an encore-side technique.

Turn now to FIG. 2 for an example of an encoder for an encode-side solution. A mono audio signal with an indicated direction 200 such as from a real-world microphone or synthetic computer-generated audio sends audio to an encoder 202. The encoder 202 is provided with a direction to project into the spherical harmonics basis. This yields a vector of coefficients for each spherical harmonic, which is subsequently used to mix a mono audio signal into the Ambisonics channels associated with each component. Thus, the output of the encoder 202 is an Ambisonics soundfield of a given order, with plural encoders receiving input from respective mono audio signals with directions for each order desired.

Note that each sound source would typically only be encoded into a single Ambisonics order, meaning each encoder receives input from a different source. The typical use case would be different sounds encoded into different orders. For example, someone's voice may be encoded at the highest available order for the best localization accuracy (e.g., fifth order). But a sound intended to be more diffuse may be encoded into a lower order (e.g., third order).

A weighting function 204 is applied (e.g., as by multiplication) to each order. The weights here refer to the single order spatial window applied to each respective order prior to mixing. Because they are applied to each Ambisonics order separately prior to mixing, single-order spatial window techniques can be used. A mixer 206 mixes the orders with the resulting output being stored in storage 208 and/or transmitted by a transmitter 210 to a receiver for playing the audio.

The weighting function 204 is applied to each soundfield of a different order before the orders mixed into a single higher-order soundfield. The soundfields may contain synthesized Ambisonics and/or Ambisonics captured with microphones directly as mentioned above.

In one embodiment of the encode side solution, the weighting function 204 may be applied to an unweighted Ambisonics soundfield directly, whether captured from a microphone, and/or pre-synthesized with an encoder (as above). Accordingly, in this embodiment a mono signal plus direction is sent to a weighted encoder, which outputs a single order Ambisonics soundfield of one order that is then mixed with multiple other orders output by multiple respective weighted encoders.

In another embodiment of the encode side solution, the weighting function 204 is applied during encoding. In other words, when encoding a mono audio signal with a direction into Ambisonics, the coefficients of the soundfield are directly multiplied with a weighting vector before mixing the mono audio signal into Ambisonic channels. In this embodiment, the weighting is not applied to the audio data directly, but to the Ambisonics encoding coefficients. These are linear operations, so the results are the same as in the first embodiment. In this second embodiment, a single order Ambisonics soundfield is weighted and then mixed with other weighted soundfield orders.

Expounding further on the above-described techniques, a respective spatial window is applied to each order via a weighting vector. The "weights" in FIGS. 8 and 9 for example all refer to spatial window weights. Spatial window weights are used to optimize Ambisonics panning behavior, and to reduce side lobes and order-truncation artifacts, etc. This is relevant for both encode/decode solutions, incidentally.

By applying the weighting vector is meant an element-wise multiplication of the weighting vector and the Ambisonics data (or encoding coefficients). As an example, a direction is projected into the spherical harmonics basis. In the fifth order Ambisonics case, for example, this will generate a vector of 36 coefficients (each scalar entry corresponding to a spherical harmonics basis function). The weighting vector to achieve the spatial window effect is an additional vector with 36 entries, which can be "applied" by multiplying element-wise with the spherical harmonics coefficients themselves, or by multiplying with the audio samples of already encoded Ambisonics channels. The weightings can be established to "warp" the soundfield in various ways, which this spatial window technique falls under. Typically for this "spatial window" purpose, the weights taper off (from low to high order components). This form is a spatial low-pass filter. The lower order components sample space at a lower frequency, and the higher order components sample space at a higher frequency.

The side lobes are a "spatial aliasing" artifact that is introduced by under-sampling space with order-truncated spherical harmonics. So, this can be mitigated by smoothly reducing the amount of high frequency information in much the same way that one would filter audio.

By fifth order Ambisonics is meant all the constituent Ambisonics components (spherical basis functions) up to and including those introduced by truncating the spherical harmonics at fifth order. Thus 2N+1=11 components are introduced at the fifth order, but complete fifth order Ambisonics is represented by (N+1)^2=36 basis functions, components, channels, etc. The eleven components may be referred to as the fifth order spherical harmonics, but not complete fifth order Ambisonics, in which case the eleven components may be thought of as representing an incomplete partitioning of the soundfield (in this case, the areas of space denoted in FIGS. 4 and 10).

Emphasizing or de-emphasizing these components individually would have warping/distorting effects on the soundfield (as mentioned above).

In generic terms, the goal of the above techniques is to improve the quality of a multi-order Ambisonics encode/decode by mitigating artifacts introduced via order-truncation. A typical target is to achieve an optimal balance of attenuating the side lobes without distorting the main lobes for multiple Ambisonics orders.

The encode-side techniques herein mitigate artifacts of each Ambisonics order prior to mixing, while the decode-side techniques optimize for a spatial window/weighting vector that achieves this effect across orders that have already been mixed.

Figure 3:
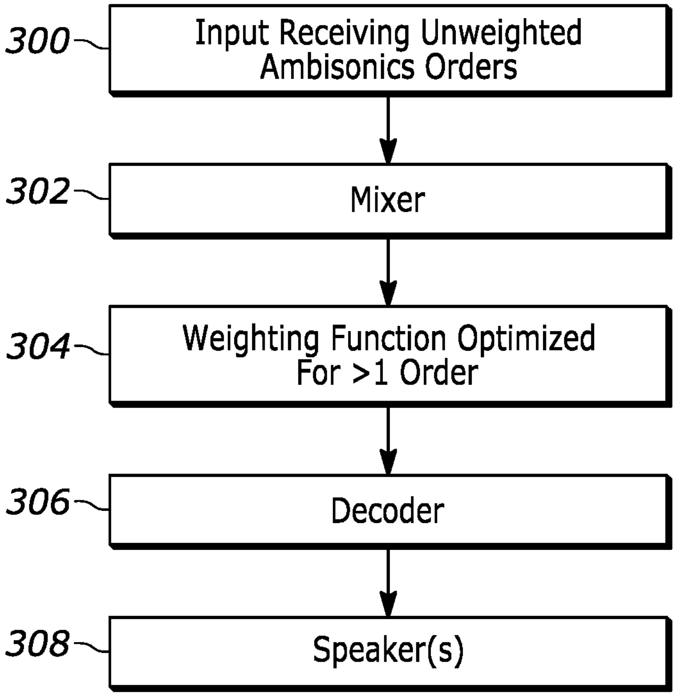
FIG. 3 illustrates an example decoder for a decode-side technique.

Turn now to FIG. 3 for an example of a decode-side solution when the encoder of FIG. 2 is not used. An input 300 receives unweighted Ambisonics orders which can be mixed by a mixer 302. A weighting function 304 that is optimized in a single spatial window for more than one order is plied to the mixed (combined) orders received from the mixer 302. The weighted audio is decoded by a decoder 306 and played by one or more speakers 308.

Figure 4:
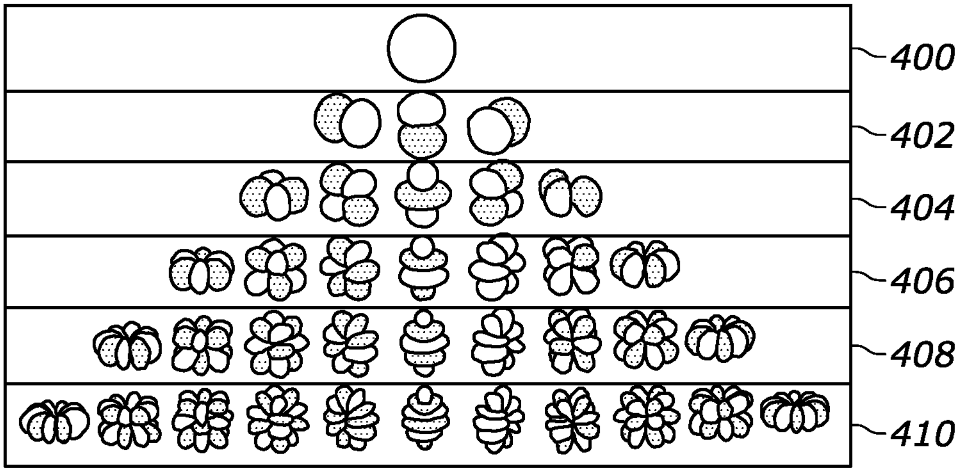
FIG. 4 illustrates example multi-order Ambisonics sound fields.
Figure 5:
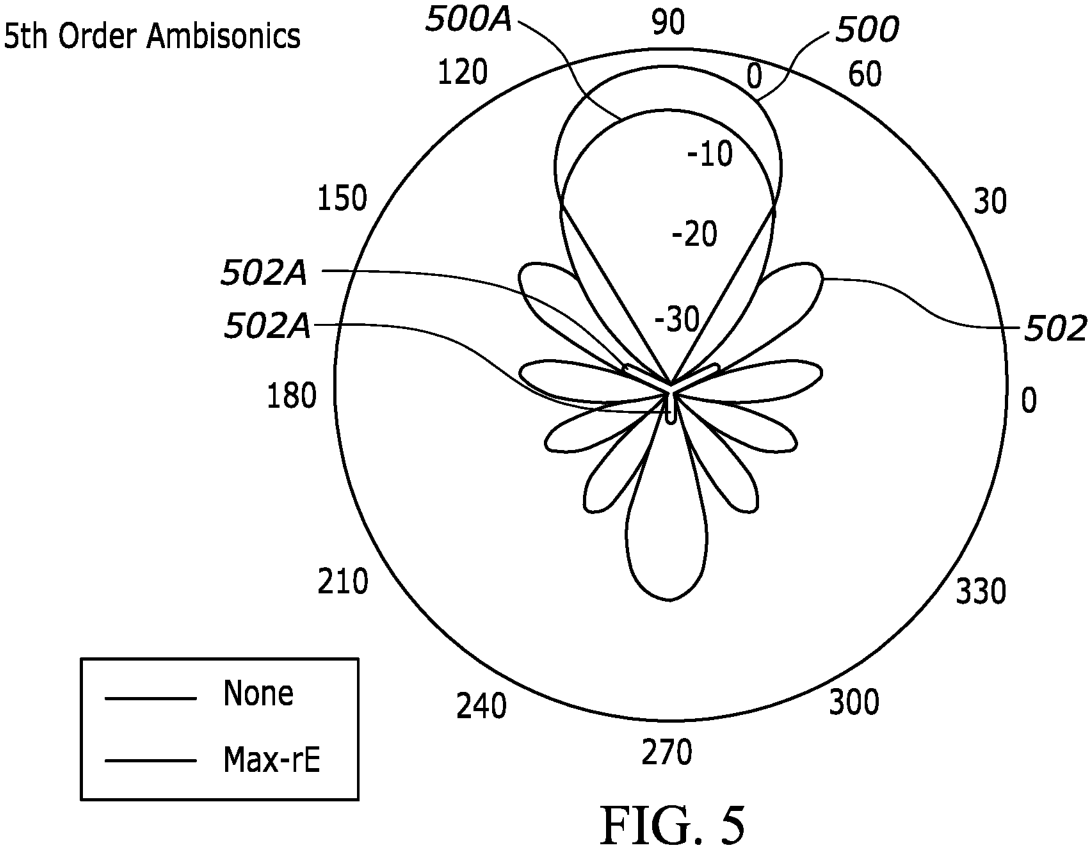
FIG. 5 illustrates an example pre- and post-weighting Ambisonics sound field.

FIGS. 4 and 5 illustrate example non-limiting Ambisonics orders. Specifically, in FIG. 4 a zero-order Ambisonics sound field 400 providing a single Ambisonics channel appears as a sphere. A first order Ambisonics sound field 402 providing three Ambisonics channels appears as twin attached objects in different orientations. A second order Ambisonics sound field 404 providing five Ambisonics channels appears as shown in combinations of shapes described above in different orientations. A third order Ambisonics sound field 406 providing seven Ambisonics channels appears as shown in combinations of shapes described above in different orientations. A fourth order Ambisonics sound field 408 providing nine Ambisonics channels appears as shown in combinations of shapes described above in different orientations. A fifth order Ambisonics sound field 410 providing eleven Ambisonics channels appears as shown in combinations of shapes described above in different orientations.

The shapes as described in FIG. 4 are visualizations of the spherical harmonics. The distance of the surface from the origin is the absolute value of the spherical harmonics evaluated at a given direction, and the shading describes the polarity (light is positive, dark negative). The individual rows (400, 402, 404, etc.) do not fully describe soundfields in and of themselves. An Nth order soundfield contains all components from orders 0→N. Each order adds 2N+1 components (1, 3, 5, 7, 9, 11), but contains (N+1)^2 components (0, 4, 9, 16, 25, 36, etc.) in total.

In FIG. 5, an example non-limiting fifth order Ambisonics sound field is shown with a main lobe 500 and side lobes 502. To give better sound production it may be desirable to suppress the side lobes 502 without overly distorting the main lobe 500. In the example shown, an example weighting function known as "max-rE" has been applied to result in suppressed side lobes 502A with only a marginally distorted main lobe 500A. Note that the max-rE function is but one weighting function that may be used. Other example weighting techniques can include "spatial tapering" that uses a Hann window (derived from standard Fourier windowing techniques) and a so-called "in-phase" weighting, which fully suppresses side lobes at the cost of a much wider main lobe.

Note that rigorously speaking, FIG. 5 does not represent a fifth order Ambisonics soundfield in and of itself but rather a horizontal cross-section of a fifth order-truncated spatial Dirac pulse (basically just a point in some direction). The typical nomenclature for these shapes is "virtual microphone patterns" because it represents how a point source would be represented in the Ambisonics domain, which is analogous to microphone polar patterns.

The side/back lobes that do not point in the direction of the sound source are artifacts due to the order truncation.

Figure 6:
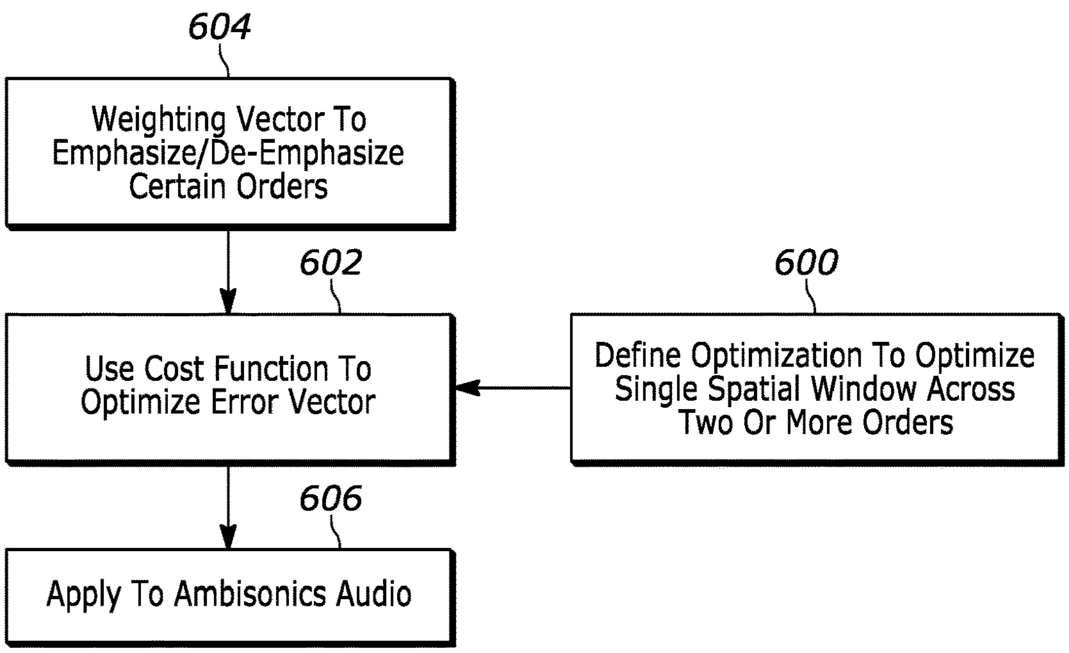
FIG. 6 illustrates an example overall decode-side technique.

FIG. 6 illustrates a technique for a general decode-side solution. Commencing at block 600, an optimization problem (using an optimization function) is defined that optimizes a single spatial window across two or more Ambisonics orders (0<=n<=N). This is an arbitrary selection depending on the target use case, but the simplest case would be to select all orders 0<=n<=N with equal weight. This ensures optimizing a set of weights across all possible Ambisonics orders used. But, if it is known that only two orders are used, for example, that case may be optimized as well. The outcome is still a single set of weights applied to the "top-level" Ambisonics audio. This single Ambisonics soundfield contains within it at least one other Ambisonics soundfield of lower order. "Soundfield" refers to the set of Ambisonics audio channels that encode the spatial information at some order (e.g., fifth order Ambisonics soundfield, which would be 36 channels of Ambisonically encoded audio). In this example, the fifth order soundfield may contain within it a full third order soundfield (16 channels). The third order soundfield includes audio up to the first 16 channels, instead of the full 36.

Proceeding to block 602, a cost function is used in connection with the optimization function to optimize an error vector across all selected Ambisonics orders. The cost function may employ at least one weighting vector 604 that is can be introduced into the cost function to emphasize or de-emphasize certain orders. The output of the cost function is applied to Ambisonics audio at block 606 and the audio is then played on one or more speakers such as any speaker systems described herein.

Example optimization algorithms includes one or more of a Broyden-Fletcher-Goldfarb-Shanno (BFGS) function, a Sequential Least Squares Programming (SLSQP) function, a trust-region function, a quasi-newton function, and a neural-network.

The cost function may be agnostic of the decoder or optimized for a closed encode/decode system, and tuned for different optimization criteria. If the decoder is known at encode time, more information may be used to optimize for the specific system. Decoder-agnostic cost functions can include metrics derived from the Ambisonics encoding function directly such as maximizing the energy vector (as-in max-rE) across the selected orders, minimizing apparent-source width (angular metric derived from energy vector), frequency-dependent error, etc. Decoder-dependent cost functions can include minimizing an error from the Ambisonics decode by comparing against a known reference such as a head-related transfer function (HRTF) for binaural decoding. Note that HRTFs may be different for each ear, or symmetric, and each ear may be optimized independently or simultaneously. For decoding for a speaker system with more than two speakers, the error metric can be minimized against direct speaker signal or a point-source amplitude panning algorithm such as vector-based amplitude panning (VBAP).

Cost functions generally calculate frequency space error metrics such as log-spectral distortion, Itakura-Saito distance, magnitude least squares, or some other weighted spectral distance (e.g., via inverse equivalent rectangular bandwidth)

Figure 7:
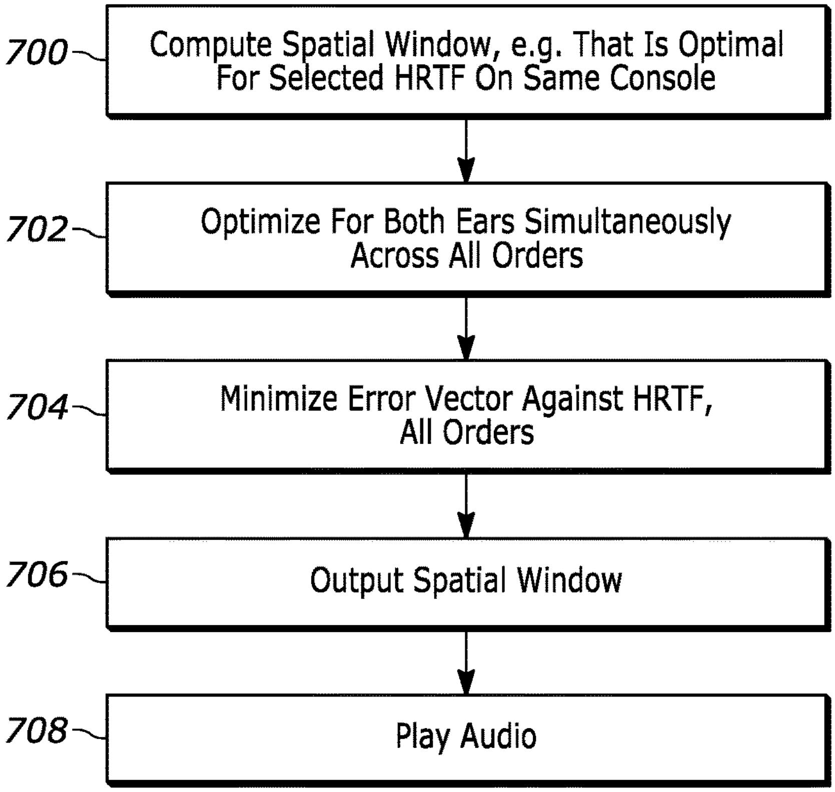
FIG. 7 illustrates an example specific decode-side technique for headphones.

FIG. 7 provides an example of a specific implementation in which at block 700 a spatial window is computed that is optimized for the user's selected HRTF profile on a game console such as a PlayStation-5 console. Moving to block 702, optimization is executed for both ears simultaneously, across all orders (for example, zero through five).

Block 704 indicates that an optimization function such as the BFGS algorithm may be used to minimize the magnitude of the error vector created via computing the magnitude least-squares error against the reference HRTF across all orders ($0<=n<=5$). The resulting output at block 706 is a spatial window that optimizes Ambisonics panning such that the error between the binaural Ambisonics decode and direct HRTF rendering are minimized for multi-order Ambisonics soundfields (up to the fifth order in this example). Resulting audio is played at block 708.

Figure 8:
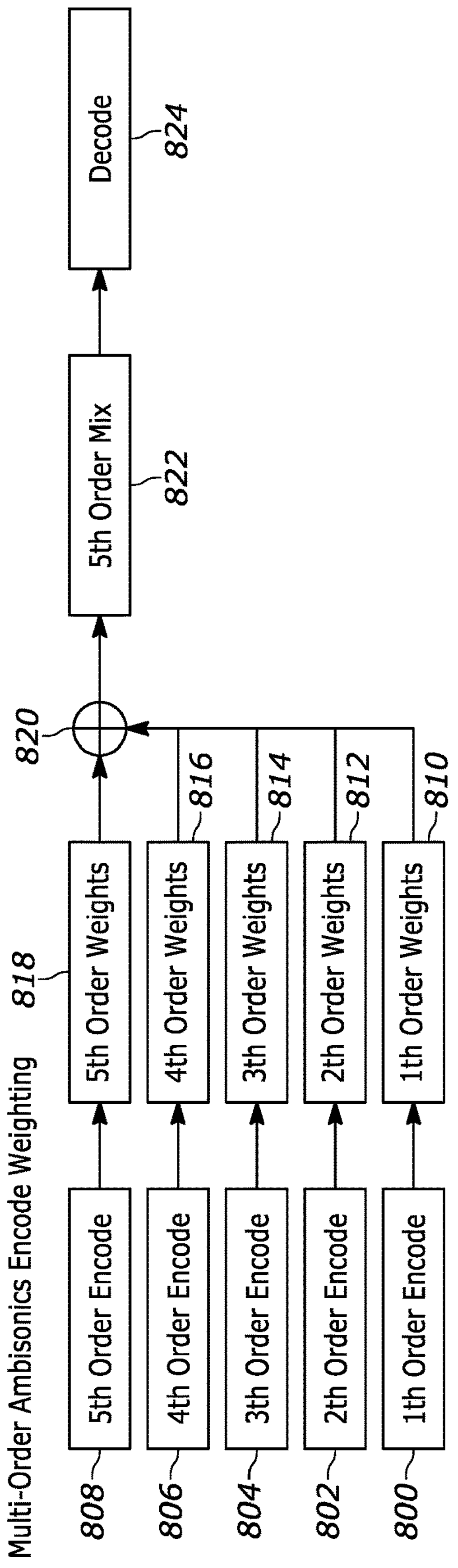
FIG. 8 illustrates signal flow for an example encode-side technique.
Figure 9:
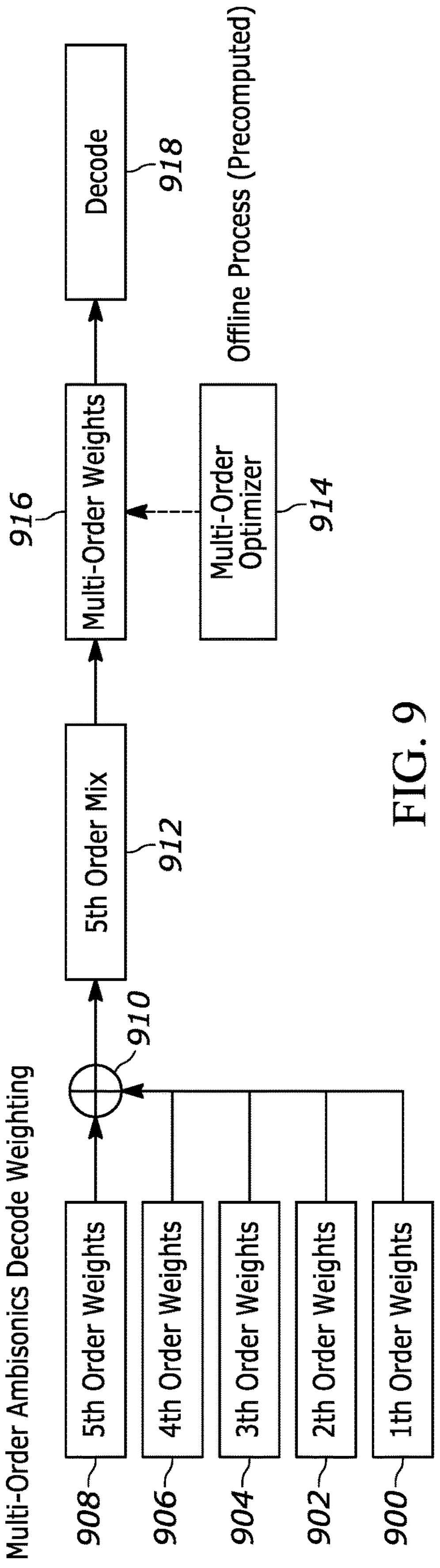
FIG. 9 illustrates signal flow for an example decode-side technique.
Figure 10:
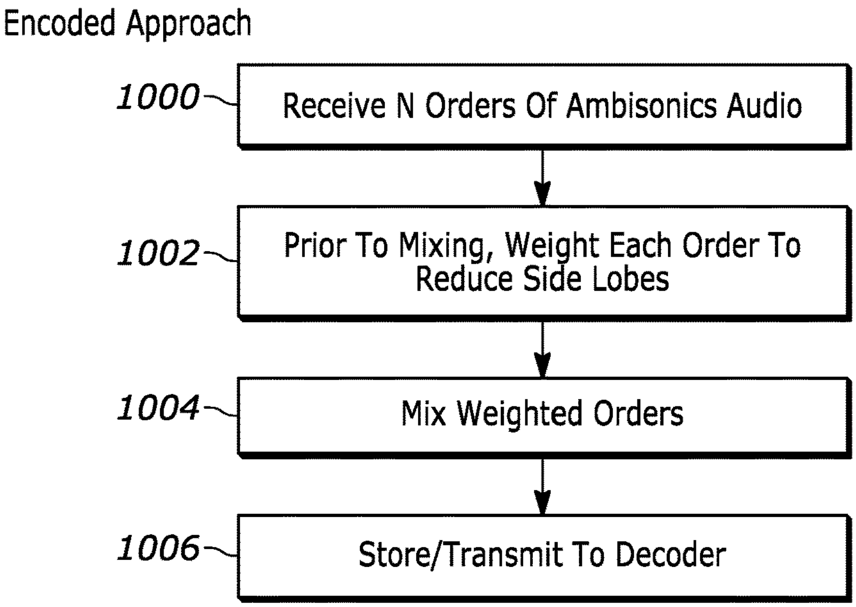
FIG. 10 illustrates example logic in example flow chart format related to FIG. 8.
Figure 11:
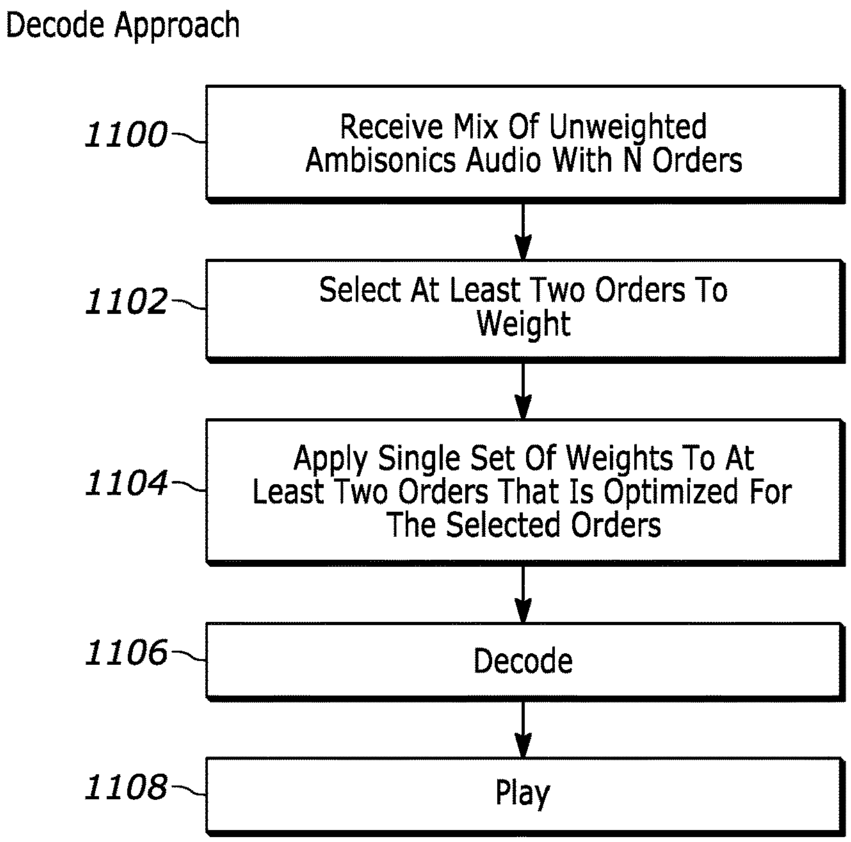
FIG. 11 illustrates example logic in example flow chart format related to FIG. 9.

FIGS. 8 and 10 illustrate encode-side multi-order weighting and FIGS. 9 and 11 illustrate decode-side multi-order weighting when the encode-side techniques of FIGS. 8 and 10 are not used.

In FIG. 8, first through fifth Ambisonics orders 800-808 in an Ambisonics audio signals are encoded. It is to be understood that in general, two or more orders are encoded. Respective weights 810-818 are applied to the respective orders 800-808. Weighting here refers to a single-order spatial window, not a uniform weighting vector to (de-) emphasize orders. The weighted encoded orders are summed at 820 to produce a mix 822 with, in the example shown, the fifth order being the highest order. The mix may be supplied to a decoder 924.

In FIG. 9, first through fifth order Ambisonics orders are received and summed at 910 to produce a mix 912 with, in the example shown, the fifth order being the highest order. A multi-order optimizer 914 applies weights 916 optimized for some or all of the orders in the mix 912 albeit in the single spatial window of the mix 912 to emphasize or de-emphasize respective orders. A decoder receives the output and decodes the Ambisonics audio to play the audio on one or more speakers.

FIG. 10 illustrates principles of the encode technique of FIG. 8 and may be implemented as executable instructions in any one or more processors. FIG. 10 may be particularly useful for the second embodiment of FIG. 2 discussed above. Commencing at block 1000, N orders of Ambisonics audio are received, with N being an integer greater than one. Proceeding to block 1002, prior to mixing the orders together, each order is weighted to, e.g., de-emphasize the size of its side lobes. The orders are then mixed at block 1004 and stored and/or transmitted to a decoder in an audio player at block 1006.

FIG. 11 illustrates principles of the decode technique of FIG. 9 and may be implemented as executable instructions in any one or more processors. Commencing at block 1100, N unweighted orders of Ambisonics audio are received in a single spatial window, with N being an integer greater than one. Moving to block 1102, at least two of the received orders are selected to weight. The selection may be application-specific as described above. Proceeding to block 1104, a single set of weights is applied to the orders selected at block 1102 with the set of weights being optimized across the selected orders in the spatial window. The audio is decoded at block 1106 and played on at least one speaker at block 1108.

A reference signal may be injected with a microphone signal to track the headphone coupling to ears, for example, where the pass through is not the ideal HRTF due to misfit, or hair, or movement like jogging etc. This can be achieved by capturing the frequency response between some microphone in a listener's ear and the output of the headphone driver. If the microphone response is known, the isolated frequency response of the headphone driver relative to the in-ear location may be discerned and applied to an inverse filter to remove the effects of the headphone. Prediction and correction of certain scenarios involving non-stable operation may also be effected. For one example, if a leading edge oscillation pattern is detected, e.g., when jogging with misfit headphones that would have cadence observed that syncs with runners stride, the optimization above may be adaptively modified in the manner of a phase lock loop and window at each cycle, with the transfer function being changed along the sine wave defining each cycle correcting the transfer along the way.

While the particular embodiments are herein shown and described in detail, it is to be understood that the subject matter which is encompassed by the present invention is limited only by the claims.

What is claimed is:

1. An apparatus comprising:

at least one processor configured with instructions which are executable to:

receive Ambisonics audio comprising at least two soundfields of different orders;

identify at least one optimization function;

apply at least one cost function to the optimization function to optimize at least one error over the at least two soundfields in a single spatial window of the Ambisonics audio, the cost function comprising at least one weighting vector to emphasize or de-emphasize at least one of the orders; and based at least in part on at least one output of the cost function, generate audio signals for play on at least one speaker.

2. The apparatus of claim 1, wherein the error comprises at least one error vector.

3. The apparatus of claim 1, wherein the optimization function comprises a Broyden-Fletcher-Goldfarb-Shanno (BFGS) function.

4. The apparatus of claim 1, wherein the optimization function comprises a Sequential Least Squares Programming (SLSQP) function.

5. The apparatus of claim 1, wherein the optimization function comprises a trust-region function.

6. The apparatus of claim 1, wherein the optimization function comprises a quasi-newton function.

7. The apparatus of claim 1, wherein the optimization function comprises a neural-network.

8. The apparatus of claim 1, wherein the cost function is agnostic of a decoder configured to decode the audio signals.

9. The apparatus of claim 8, wherein the cost function comprises metrics derived from an Ambisonics encoding function.

10. The apparatus of claim 9, wherein the cost function comprises maximizing an energy vector across at least two orders.

11. The apparatus of claim 9, wherein the cost function comprises minimizing apparent-source width.

12. The apparatus of claim 9, wherein the cost function comprises minimizing frequency-dependent error.

13. The apparatus of claim 1, wherein the cost function is dependent on a decoder configured to decode the audio signals.

14. The apparatus of claim 13, wherein the cost function comprises minimizing error from the decoder by comparing output of the decoder against a reference.

15. The apparatus of claim 1, wherein the cost function calculates frequency space error metrics.

16. The apparatus of claim 1, wherein the instructions are executable to configure the audio signals for play on a Binaural system at least in part by minimizing an error metric against at least one Head-Related Transfer Function (HRTF).

17. The apparatus of claim 1, wherein the instructions are executable to configure the audio signals for play on a speaker system comprising more than two speakers at least in part by minimizing an error metric against a direct speaker signal or point-source amplitude panning algorithm.

18. The apparatus of claim 17, wherein the panning algorithm comprises a vector-based amplitude panning algorithm.

19. A method for computing an Ambisonics spatial window that is optimized for a head-related transfer function (HRTF) comprising:

optimizing the Ambisonics spatial window across at least two orders;

using an optimization function, minimizing a magnitude of an error vector created by at least one cost function against the HRTF across the at least two orders to return the Ambisonics spatial window; and using the Ambisonics spatial window to play audio on at least one speaker.

20. A decoder assembly comprising:

circuitry configured to:

receive Ambisonics audio comprising at least two soundfields of different orders;

apply at least one cost function to an optimization function to optimize at least one error over the at least two soundfields in a single spatial window of the Ambisonics audio, the cost function comprising at least one weighting vector; and based at least in part on at least one output of the cost function, generate audio signals for play on at least one speaker.

* * * * *